United States Patent [19]
Godlewski

[11] 3,758,143
[45] Sept. 11, 1973

[54] SPATULA

[75] Inventor: Joseph F. Godlewski, Gaithersburg, Md.

[73] Assignee: Vincent K. McMahon, Gaithersbury, Md. ; a part interest

[22] Filed: Nov. 30, 1971

[21] Appl. No.: 203,368

[52] U.S. Cl. .................................................. 294/8
[51] Int. Cl. ............................................ A47j 43/28
[58] Field of Search .................... 294/7, 8; 15/235.4, 15/235.8

[56] References Cited
UNITED STATES PATENTS
2,616,285  11/1952  Shields.............................. 15/235.7
3,079,622  3/1963  Smyers et al. ..................... 15/235.7
2,601,360  6/1952  Blackshear.......................... 294/8

*Primary Examiner*—Evon C. Blunk
*Assistant Examiner*—Johnny D. Cherry
*Attorney*—Brady, O'Boyle & Gates

[57] ABSTRACT

A spatula for lifting and turning food items on a grill or the like embodies a pair of spatula blades arranged substantially at right angles. A manipulating handle is secured to the blade structure and extends beyond one end thereof along a line parallel to the vertex of the dihedral angle formed by the blade. The construction of the spatula assists in the turning over of eggs, hamburgers and the like and tends to shield the user from splattering by hot grease. The device may also be used as a scoop for certain foods in particle form.

7 Claims, 12 Drawing Figures

PATENTED SEP 11 1973    3,758,143
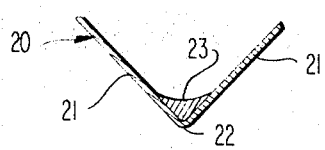
FIG. 2
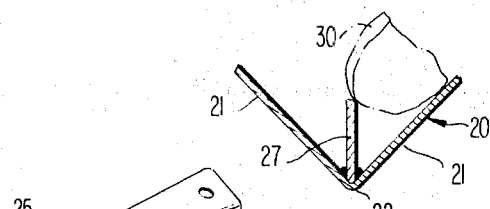
FIG. 5
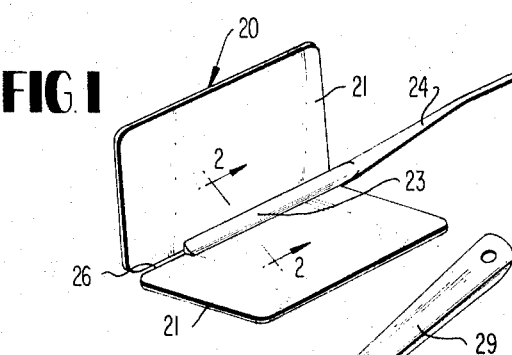
FIG. 1
FIG. 3
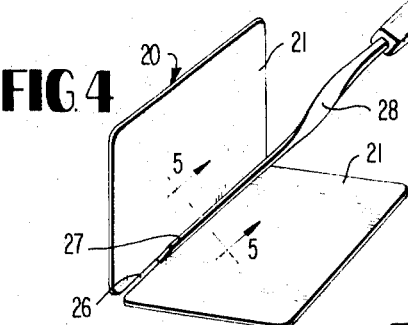
FIG. 4
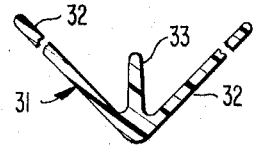
FIG. 6
FIG. 9
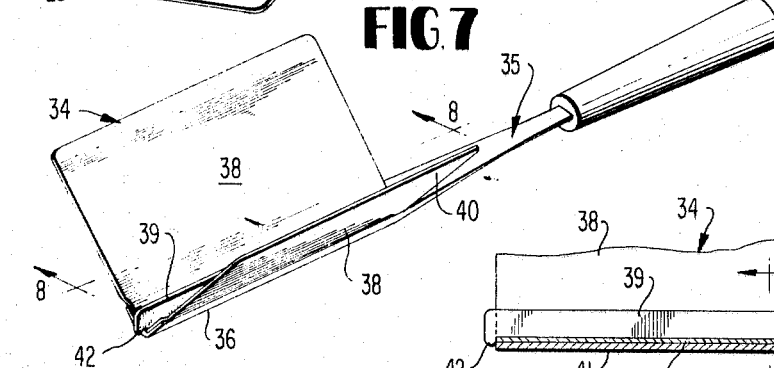
FIG. 7
FIG. 10
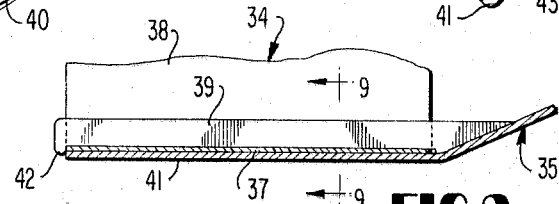
FIG. 8
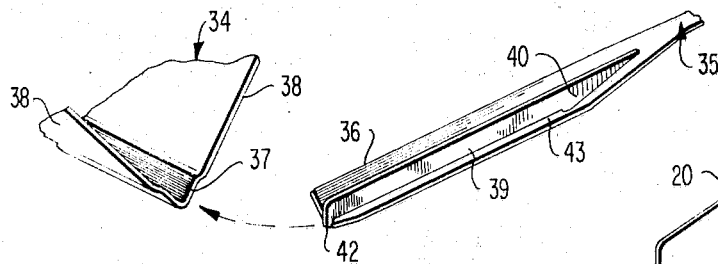
FIG. 11
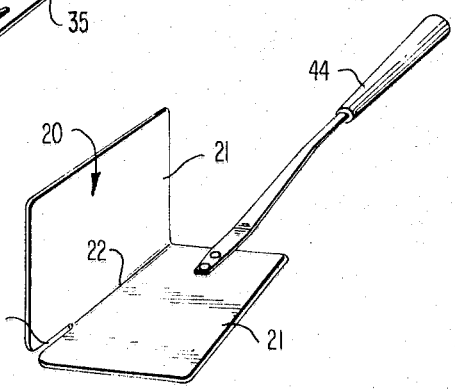
FIG. 12

SPATULA

Conventional spatulas embody a single flat thin resilient blade with which food articles on a grill or frying pan are customarily lifted and turned. The implement, while generally effective, is somewhat inefficient and falls short of satisfying the need completely, particularly in connection with commercial establishments where large numbers of food items must be handled as rapidly as possible. This is particularly true in restaurants which employ large grills for cooking hamburgers, fried eggs, pancakes and the like.

A chief difficulty or deficiency in the conventional spatula lies in its inability to steady the food item, such as a fried egg, during the turning process. Particularly when in the presence of hot grease, an egg or the like may tend to slide off of the spatula prematurely with the result that the egg yolk will be broken and the order of the grill will be disturbed. Accordingly, the object of this invention is to provide an improved spatula which will greatly facilitate the handling and in particular the turning of certain delicate items, such as eggs and pancakes. The spatula is constructed to utilize gravity in such a way as to actually assist in the turning over process. The food articles are prevented from slipping off the spatula prematurely. During the turning over of foods on a grill, the spatula forms a protective shield so that the user will not be splattered with hot grease. Additionally, the device may be conveniently used for scooping up fried potatos and similar food particles from a grill or frying pan. In one form of the invention, the spatula blade is detachable from the handle to facilitate cleaning.

Various additional features and advantages of the invention will be apparent during the course of the following description.

BRIEF DESCRIPTION OF DRAWING FIGURES

FIG. 1 is a perspective view of a spatula embodying the present invention;

FIG. 2 is an enlarged transverse fragmentary cross section taken on line 2—2 of FIG. 1;

FIG. 3 is an end elevation of the spatula in FIG. 1;

FIG. 4 is a perspective view of a modified form of spatula;

FIG. 5 is a fragmentary cross sectional view on an enlarged scale taken on line 5—5 of FIG. 4;

FIG. 6 is a fragmentary cross sectional view showing a modification of the spatula in FIGS. 4 and 5;

FIG. 7 is a perspective view of a spatula in accordance with another modification;

FIG. 8 is a longitudinal cross section taken on line 8—8 of FIG. 7;

FIG. 9 is an enlarged fragmentary vertical section taken on line 9—9 of FIG. 8;

FIG. 10 is a cross sectional view similar to FIG. 9 with the spatula body removed from the handle;

FIG. 11 is a fragmentary exploded perspective view of the spatula shown in FIG. 7; and FIG. 12 is a perspective view of a further modified form of spatula according to the invention.

DETAILED DESCRIPTION OF PREFERRED EMBODIMENTS

Referring to the drawings in detail wherein like numerals designate like parts, FIGS. 1–3 inclusive show an embodiment of the invention wherein a spatula comprises a body portion 20 including a pair of thin flat resilient blades 21 arranged substantially at right angles and integrally joined at a vertex 22 so as to form a dihedral angle. The spatula body is formed of resilient sheet metal or the like. Attached to the spatula body 20 at the interior of the vertex 22 is a forward handle portion 23, preferably formed to produce a fillet inside of the vertex 22 to prevent the accumulation of grease and foreign matter. The handle portion 23 may be spot welded to the spatula body 20 or secured thereto in any preferred manner.

Rearwardly of the spatula body, the handle rises from the vertex 22 as at 24 to facilitate clearing the rim of a frying pan or the like and from this point the handle is extended rearwardly for a convenient distance along a line parallel to the vertex 22 and at its rear end carries a suitable grip 25.

To increase the resiliency of the spatula, particularly at its leading end, the handle portion 23 is terminated substantially rearwardly of the leading end of the body 20 and from this point forwardly a slot 26 is formed in the spatula body along the vertex 22 so as to divide and separate the leading end portions of the two spatula blades 21, allowing them to flex, as required, upon contact with a grill surface or the like.

In the use of the spatula as above described, an article of food, such as an egg, pancake or hamburger, is lifted from the grill surface by one of the blades 21, such blade being engaged under the food by a lateral or longitudinal movement as dictated by the position of the food on the grill or frying pan. In order to invert or turn the food article, the spatula is simply rotated on the axis of the handle and the article will pass from one blade 21 to the opposite blade while turning over and from the second blade, the article is deposited without splashing onto the grill in the desired inverted position. The double-bladed arrangement thus allows delicate articles, such as fried eggs, to be turned in a more gentle manner without breaking or damaging the article. Since the handle is at the center or vertex of the spatula body, the implement is essentially right or left handed from the start. Another feature of the device is that during the turning operation the spatula body 20 serves as a shield to protect the user from splattering grease. In some cases, the device may be employed usefully as a scoop for lifting potatos or the like from a pan or grill. The numerous advantages of the spatula over conventional types will be readily appreciated in light of the above explanation.

FIGS. 4 and 5 of the drawings depict a modification of the invention wherein the identical spatula body 20 may be utilized. Instead of the leading handle portion 23 of the prior embodiment, an upstanding blade-like leading handle portion 27 is utilized and forms an abutment or stop at the center of the right dihedral angle formed by the spatula blades 21, FIG. 5. The element 27 is secured by welding or the like to the spatula body and extends along the interior of the vertex 22 to the rear edge of the spatula body and is fixed in this position. The forward end of the stop element 27 terminates at the rear end of slot 26, as shown in FIG. 4, and the purpose of this slot is the same as described in the prior embodiment. Rearwardly of the element 27, the spatula handle is offset upwardly from the vertex 22 as shown at 28 and the rear end of the handle carries a convenient grip 29.

In use, when turning a food article, such as a fried egg or hamburger 30, FIG. 5, when the spatula is rotated on the axis of its handle, the food article 30 will slide down one blade 21 toward the vertex 22 and will be arrested by the stop 27. In response to continued rotation of the spatula, the article 30 will be flipped over cleanly onto the opposite blade 21 and from this second blade will be deposited onto the cooking surface. While the stop element 27 is not essential, it has been found to improve the turning operation and is therefore preferred.

FIG. 6 shows a slight variation of the construction in FIGS. 4 and 5, wherein the entire spatula body 31 including the two right angular blades 32 and central rib-like stop 33 are all integrally formed by molding or casting from a suitable plastic, ceramic material or the like. In all other respects, the spatula in FIG. 6 is the same as the embodiment of FIGS. 4 and 5 and is utilized in the same manner. Preferably, the rib-like stops 27 and 33 project above the vertex of the spatula body for approximately one/fourth inch. FIG. 3 shows the spatula positioned on a cooking or grilling surface for lifting a food article prior to turning it.

FIGS. 7 through 11 show another modification wherein the right angular spatula body 34 is readily detachable from a handle 35 for convenience in cleaning so that no food particles or grease will accumulate in corners or crevices. In this embodiment, the handle 35 includes a leading extension 36 which is V-shaped and right angular in cross section and immediately underlies the vertex portion 37 of spatula body 34, the latter portion being struck upwardly somewhat from the planes of spatula blades 38, FIG. 9, so as to provide a smooth exterior surface near the vertex of the spatula.

The handle 35 additionally carries at its center an upstanding blade or rib element 39 which divides the dihedral angle equally and serves as a stop for food articles during the turning operation, as described previously. The rib element 39 has its rear end portion 40 fixed to the handle 35 by welding or the like and forwardly of this point, the element 39 is unattached to the handle extension 36 and is spaced slightly above the vertex 41 of this extension, as best shown in FIG. 10. The leading end of the element 39 has a small depending projection 42 which serves as a detent to retain the spatula body 34 on the handle 35 until separation of the parts is required. The element 39 is somewhat resilient or yielding since it is cantilevered forwardly from its attachment at 40 to the handle.

When the spatula is assembled for use, the body 34 is slid longitudinally over the V-shaped extension 36 and under the resilient element 39. The vertex of the right angular body 34 enters the narrow space 43, FIG. 10, beneath the element 39 and between it and the handle extension 36. When the spatula body 34 reaches the rear end of the space 43, the detent element 42 will snap over the leading edge of vertex portion 37 and lock the spatula body firmly to the handle. The spatula shown in FIGS. 7 to 11 is utilized in the same manner as described in connection with FIGS. 4 to 6, when picking up and turning over food articles. If it is desired to render the leading ends of the spatula blades 38 more resilient, these blades may be extended somewhat beyond the handle extension 36 and provided with a central slot similar to the slot 26.

FIG. 12 shows another modification wherein the spatula body 20, previously described, may be utilized together with a manipulating handle 44 which is attached to the rear end portion of one blade 21 near the transverse center thereof and therefore spaced laterally from the vertex 22. The handle 44 extends parallel to the vertex. This off-center relationship of the handle to the body of the spatula enables the spatula to be self-turning to a degree when an article of food is lifted on the blade 21 having the handle secured thereto. When the spatula is rotated to transfer the food to the other blade 21 remote from the handle, the shifting of weight away from the handle axis assists in the turning operation because of the off-center or eccentric relationship of handle to spatula body.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A spatula for turning a load thereon, comprising a spatula body, said body formed of resilient sheet material and consisting of a pair of divergent blades disposed approximately at right angles to each other and having inwardly facing free load engaging working surfaces so that said body forms a dihedral angle with the blades joined along the vertex of the dihedral angle, a handle attached to the spatula body and extending beyond one end of the body in approximate parallelism with said vertex, and said spatula body having a narrow slot formed in its leading end substantially on and along said vertex opposite the end to which said handle is attached of a width spacing the planes of said blades laterally whereby each of the leading ends of said blades is positioned to independently resiliently flex inwardly relative to and adjacent to the leading end of the other blade while a load is engaged on the inwardly facing working surface of one of said blades, an upstanding stop element connected on the interior of and extending the length of the connecting vertex and terminating rearwardly of the narrow slot and approximately bisecting said dihedral angle, and said handle adapted to be rotated to simultaneously turn and transfer a load from the said working surface of one of said blades to the adjacent said working surface of the other of said blades.

2. The structure of claim 1, and said handle being attached to said spatula body substantially at said vertex.

3. The structure of claim 2, and the handle including a leading portion lying in intimate connection with and only on the interior of the vertex throughout its length and clear of the working surfaces of said pair of blades and terminating rearwardly of the narrow slot in the leading end of the spatula body.

4. The structure of claim 3, and said leading portion of the handle lying on the interior of said vertex comprising an upstanding stop element extending the length of the vertex and connecting approximately bisecting said dihedral angle.

5. A spatula comprising a spatula body, said body consisting of a pair of divergent blades disposed approximately at right angles to each other so that said body forms a dihedral angle with the blades joined along the vertex of the dihedral angle, a handle attached to the spatula body substantially at said vertex and extending beyond one end of the body in approximate parallelism with said vertex, said handle including a leading portion lying on the interior of the vertex and terminating rearwardly of the leading end of the spatula body, said spatula body having a slot opening in the vertex through the leading end thereof forwardly of the terminal end of said leading portion, and said leading portion of the handle comprising an upstanding stop element in the form of a narrow shallow blade-like element rising from said vertex and approximately bisecting said dihedral angle and extending from said slot rearwardly to the rear end of said spatula body.

6. A spatula comprising a spatula body, said body consisting of a pair of divergent blades disposed approximately at right angles to each other so that said body forms a dihedral angle with the blades joined along the vertex of the dihedral angle, a handle attached to the spatula body and extending beyond one end of the body in approximate parallelism with said vertex, releasable detent means on said handle engaging the spatula body and comprising a generally V-shaped forward extension on said handle engaging beneath the vertex of the spatula body, and an upstanding rib element on the handle overlying said V-shaped extension and engaging above the vertex of the spatula body when the latter is resting on said V-shaped extension whereby said body is rendered detachable from the handle.

7. The structure of claim 6, and said rib element attached to said handle rearwardly of the spatula body and being somewhat resilient, and a depending projection on the forward end of the rib element engaging the forward edge of the spatula body to lock the same releasably on the handle.

* * * * *